United States Patent
Fazeli et al.

(10) Patent No.: US 11,390,397 B2
(45) Date of Patent: Jul. 19, 2022

(54) DUAL STAGE STROKE ACTIVATED SHOCK STRUT SERVICE MONITORING USING SENSORS AND PHYSICAL STRUT MEASUREMENT

(71) Applicant: GOODRICH CORPORATION, Charlotte, NC (US)

(72) Inventors: Amir Fazeli, Mississauga (CA); Susanne M Reber, Strongsville, OH (US); Adnan Cepic, Mississauga (CA)

(73) Assignee: Goodrich Corporation, Charlotte, NC (US)

( * ) Notice: Subject to any disclaimer, the term of this patent is extended or adjusted under 35 U.S.C. 154(b) by 301 days.

(21) Appl. No.: 16/381,981

(22) Filed: Apr. 11, 2019

(65) Prior Publication Data
US 2020/0324920 A1 Oct. 15, 2020

(51) Int. Cl.
*B64F 5/60* (2017.01)
*G01F 22/02* (2006.01)
(Continued)

(52) U.S. Cl.
CPC ............... *B64F 5/60* (2017.01); *G01F 22/02* (2013.01); *G07C 5/0808* (2013.01); *G07C 5/0825* (2013.01); *B64C 25/58* (2013.01)

(58) Field of Classification Search
CPC ..... G07C 5/0808; G07C 5/0825; G01F 22/02; B64C 25/58
See application file for complete search history.

(56) References Cited

U.S. PATENT DOCUMENTS 8,857,582 B2 * 10/2014 Murakami .............. F16F 9/187
188/322.13
8,886,402 B1 * 11/2014 Lou ....................... F16F 15/023
701/37
(Continued)

FOREIGN PATENT DOCUMENTS

EP        3428475        1/2019

OTHER PUBLICATIONS

European Patent Office, European Partial Search Report dated Jul. 21, 2020 in Application No. 19215693.3.
(Continued)

*Primary Examiner* — James J Lee
*Assistant Examiner* — Wenyuan Yang
(74) *Attorney, Agent, or Firm* — Snell & Wilmer L.L.P.

(57) ABSTRACT

A method for monitoring a dual-stage shock strut may include measuring a first primary chamber pressure when the dual-stage shock strut is in a first state, measuring a first secondary chamber pressure when the dual-stage shock strut is in the first state, measuring a shock strut stroke when the dual-stage shock strut is in the first state, measuring a first temperature, measuring a second temperature, measuring a second primary chamber pressure when the dual-stage shock strut is in a second state, measuring a second secondary chamber pressure when the dual-stage shock strut is in the second state, and determining a servicing condition of the shock strut based upon at least the first primary chamber pressure, the first secondary chamber pressure, the shock strut stroke, the first temperature, the second temperature, the second primary chamber pressure, and the second secondary chamber pressure.

19 Claims, 8 Drawing Sheets

(51) Int. Cl.
G07C 5/08 (2006.01)
B64C 25/58 (2006.01)

(56) References Cited

U.S. PATENT DOCUMENTS

| | | | |
|---|---|---|---|
| 9,045,237 | B2 | 6/2015 | Nance |
| 9,285,007 | B2 | 3/2016 | Fazeli et al. |
| 2014/0046533 | A1* | 2/2014 | Nance ...................... B64F 5/60 701/33.7 |
| 2015/0267769 | A1* | 9/2015 | Fazeli .................. F16F 9/3292 701/3 |
| 2015/0269794 | A1* | 9/2015 | Fazeli ...................... B64F 5/60 701/34.4 |
| 2016/0052647 | A1* | 2/2016 | Fazeli ...................... F16F 9/46 29/402.01 |
| 2018/0058985 | A1* | 3/2018 | Luce ...................... B64C 25/60 |
| 2018/0273162 | A1* | 9/2018 | Fazeli .................. F16F 9/3292 |
| 2019/0009892 | A1 | 1/2019 | Fazeli et al. |
| 2019/0012848 | A1 | 1/2019 | Fazeli et al. |
| 2019/0012849 | A1* | 1/2019 | Fazeli .................. F16F 9/3292 |
| 2020/0309229 | A1* | 10/2020 | Galasso ................ F16F 9/3264 |

OTHER PUBLICATIONS

European Patent Office, European Search Report dated Oct. 23, 2020 in Application No. 19215693.3.
European Patent Office, European Office Action dated Jan. 31, 2022 in Application No. 19215693.3.

* cited by examiner

DUAL STAGE STROKE ACTIVATED SHOCK STRUT SERVICE MONITORING USING SENSORS AND PHYSICAL STRUT MEASUREMENT

FIELD

The present disclosure relates to landing gear, and more particularly, to methods for servicing and monitoring shock struts.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

Functionality and performance of a landing gear shock strut depends on internal gas and oil levels. Gas pressure and oil volume may be maintained within a design envelope to ensure that the landing gear functionality is within an acceptable range.

SUMMARY

A method for monitoring a dual-stage shock strut is disclosed, comprising measuring a first primary chamber pressure when the dual-stage shock strut is in a first state, measuring a first secondary chamber pressure when the dual-stage shock strut is in the first state, measuring a shock strut stroke when the dual-stage shock strut is in the first state, measuring a first ambient temperature corresponding to that of the dual stage shock strut when the dual stage shock strut is in the first state, measuring a second primary chamber pressure when the dual-stage shock strut is in a second state, measuring a second secondary chamber pressure when the dual-stage shock strut is in the second state, measuring a second ambient temperature corresponding to that of the dual stage shock strut when the dual stage shock strut is in the second state, and determining a servicing condition of the shock strut based upon at least the first primary chamber pressure, the first secondary chamber pressure, the shock strut stroke, the first ambient temperature, the second primary chamber pressure, the second secondary chamber pressure, and the second ambient temperature.

In various embodiments, the first state comprises the dual-stage shock strut in a static position, before a take-off event, and supporting a weight of an aircraft, and the second state comprises the dual-stage shock strut in a weight-off-wheel position within a second pre-determined duration after the take-off event.

In various embodiments, the first ambient temperature is measured using a temperature sensor in close proximity to the dual-stage shock strut.

In various embodiments, the temperature sensor is located in a wheel well of the aircraft.

In various embodiments, the shock strut stroke is measured manually.

In various embodiments, the shock strut stroke is measured via a sensor.

In various embodiments, the servicing condition comprises at least one of a primary chamber gas volume, a secondary chamber gas volume, a primary chamber oil volume, and a secondary chamber oil volume.

In various embodiments, the servicing condition is determined by solving a set of equations in table 2.

In various embodiments, the second ambient temperature measurement associated with the second state is measured within a pre-determined duration before the take-off event, and the pressure measurement associated with the second state is measured after the take-off event.

A method for monitoring a dual-stage shock strut is disclosed, comprising calculating a servicing condition of the dual-stage shock strut based upon a first primary chamber pressure when the dual-stage shock strut is in a first state, a first secondary chamber pressure when the dual-stage shock strut is in the first state, a shock strut stroke when the dual-stage shock strut is in the first state, an ambient temperature corresponding to that of the shock strut, a second primary chamber pressure when the dual-stage shock strut is in a second state, and a second secondary chamber pressure when the dual-stage shock strut is in the second state. The calculating comprises calculating a primary gas volume in the first state, calculating a primary gas volume in the second state, calculating a secondary gas volume in the first state, calculating a secondary gas volume in the second state, calculating a primary oil volume in the first state, calculating a primary oil volume in the second state, calculating a secondary oil volume in the first state, calculating a secondary oil volume in the second state, calculating a first number of moles of gas dissolved in an oil in the first state, and calculating a second number of moles of gas dissolved in an oil in the second state.

In various embodiments, the calculating includes solving an equation $$\frac{\hat{P}^a_{gas\_2} V^a_{gas\_2}}{ZR\hat{T}^a} = \frac{\hat{P}^b_{gas\_2} V^b_{gas\_2}}{ZR\hat{T}^b},$$

wherein $\hat{P}^a_{gas\_2}$ is the first secondary chamber pressure, $\hat{P}^b_{gas\_2}$ is the second secondary chamber pressure, $V^a_{gas\_2}$ is a gas volume in a secondary chamber of the dual-stage shock strut in the first state, $V^b_{gas\_2}$ is a gas volume in the secondary chamber of the dual-stage shock strut in the second state, Z is a compressibility factor, R is a universal gas constant, $\hat{T}^a$ is at least one of the ambient temperature or a second ambient temperature, and $\hat{T}^b$ is at least one of the ambient temperature or the second ambient temperature.

In various embodiments, the calculating includes solving an equation $V_{tot\_primary} - A_{P_1} \times \hat{S}^a + A_{P_2} \times (\hat{S}^a - S_{activation}) = V^a_{gas\_1} + V^a_{oil\_1}$ in response to the shock strut stroke being greater than or equal to an activation stroke of the dual-stage shock strut, wherein $V_{tot\_primary}$ is a total internal volume of a primary chamber of the dual-stage shock strut in a fully extended position, $A_{P_1}$ is an area of a primary piston of the dual-stage shock strut, $\hat{S}^a$ is the shock strut stroke of the dual-stage shock strut, $A_{P_2}$ is an area of a separator piston of the dual-stage shock strut, $S_{activation}$ is the activation stroke of the dual-stage shock strut, $V_{gas\_1}{}^a$ is a gas volume in the primary chamber of the dual-stage shock strut in the first state, and $V_{oil\_1}{}^a$ is a volume of oil in the primary chamber of the dual-stage shock strut in the first state.

In various embodiments, the calculating includes solving an equation $V_{tot\_primary} - A_{P_1} \times \hat{S}^a = V_{gas\_1}{}^a + V_{oil\_1}{}^a$ in response to the shock strut stroke being less than the activation stroke of the dual-stage shock strut, wherein $V_{tot\_primary}$ is the total internal volume of a primary chamber of the dual-stage shock strut in a fully extended position, $A_{P_1}$ is the area of the primary piston of the dual-stage shock strut, $\hat{S}^a$ is the shock strut stroke of the dual-stage shock strut, $V_{gas\_1}{}^a$ is the gas volume in the primary chamber of the dual-stage shock strut in the first state, and $V_{oil\_1}{}^a$ is the volume of oil in the primary chamber of the dual-stage shock strut in the first state.

A shock strut monitoring system is disclosed, comprising a controller and a tangible, non-transitory memory configured to communicate with the controller, the tangible, non-transitory memory having instructions stored thereon that, in response to execution by the controller, cause the controller to perform operations comprising receiving, by the controller, a first shock strut pressure, receiving, by the controller, a second shock strut pressure, receiving, by the controller, a shock strut stroke, receiving, by the controller, a first temperature, receiving, by the controller, a third shock strut pressure, receiving, by the controller, a fourth shock strut pressure, receiving, by the controller, a second temperature, and calculating, by the controller, a servicing condition of a dual-stage shock strut. The calculating the servicing condition comprises calculating, by the controller, a primary gas volume in a first state, calculating, by the controller, a primary gas volume in a second state, calculating, by the controller, a secondary gas volume in the first state, calculating, by the controller, a secondary gas volume in the second state, calculating, by the controller, a primary oil volume in the first state, calculating, by the controller, a primary oil volume in the second state, calculating, by the controller, a secondary oil volume in the first state, calculating, by the controller, a secondary oil volume in the second state, calculating, by the controller, a first number of moles of gas dissolved in an oil in the first state, and calculating, by the controller, a second number of moles of gas dissolved in an oil in the second state.

In various embodiments, the first shock strut pressure comprises a first primary chamber pressure when the dual-stage shock strut is in a first state.

In various embodiments, the second shock strut pressure comprises a first secondary chamber pressure when the dual-stage shock strut is in the first state.

In various embodiments, the shock strut stroke comprises a shock strut stroke when the dual-stage shock strut is in the first state.

In various embodiments, the first temperature comprises an ambient temperature corresponding to that of the shock strut.

In various embodiments, the third shock strut pressure comprises a second primary chamber pressure when the dual-stage shock strut is in a second state.

In various embodiments, the fourth shock strut pressure comprises a second secondary chamber pressure when the dual-stage shock strut is in the second state.

In various embodiments, at least one of the first shock strut pressure and the second shock strut pressure and at least one of the first temperature and the second temperature are measured using a single, integrated pressure/temperature sensor mounted to the shock strut.

In various embodiments, the instructions further cause the controller to perform operations comprising further comprising sending, by the controller, the shock strut servicing condition to a display.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
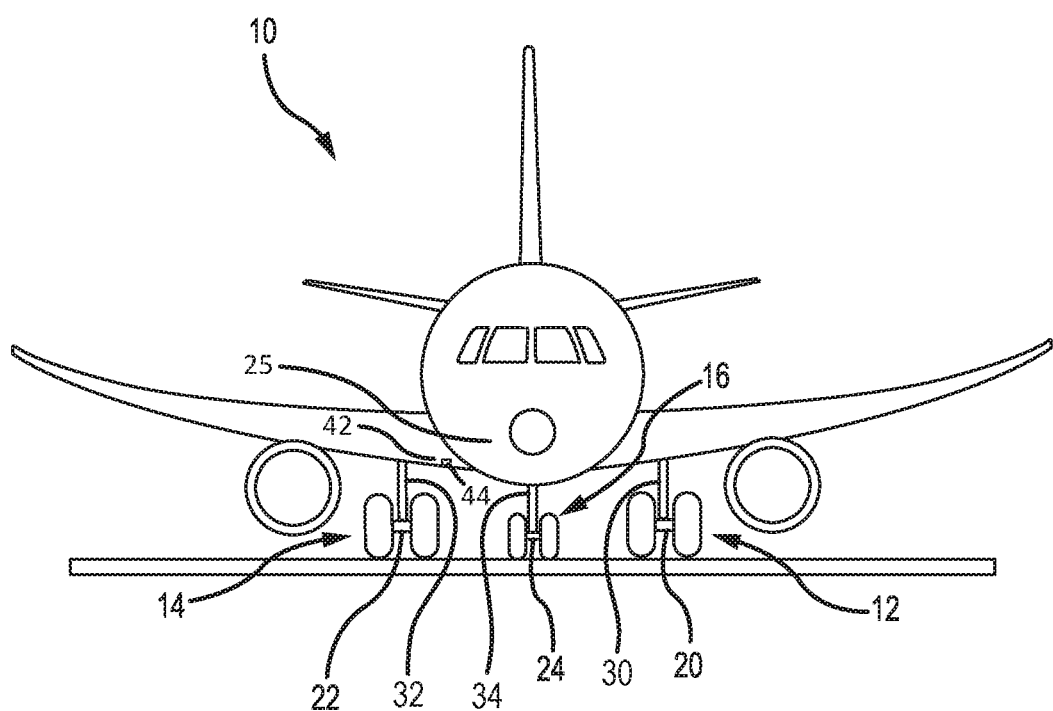
FIG. 1 illustrates an aircraft, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Aircraft landing gear systems in accordance with the present disclosure may comprise a dual-stage, stroke-activated, mixed gas/fluid shock strut (shock strut). A shock strut may comprise various fluids such as oil and gas. Performance of the shock strut may be evaluated by monitoring aspects of the shock strut, including gas temperature, gas pressure, and shock strut stroke of the shock strut under various conditions of the shock strut and aircraft. Shock strut stroke may refer to a shock strut piston position.

Gas curves used as springs in aircraft landing gear are typically calculated based upon a static test, where the shock strut is slowly compressed and decompressed, causing the pressure of the gas to slowly change in a manner to allow heat dissipation during the process. However, during operation of a vehicle, such as an aircraft for example, the shock strut may rapidly stroke causing rapid pressure changes in the gas, such as nitrogen for example, and allowing the gas to more freely move into and out a fluid, such as oil for example. During these rapid pressure changes (caused by stroking the shock absorber quickly), the oil constantly remains saturated with nitrogen. In contrast, when slowly changing the pressure during a static test, the nitrogen is not as free to go into and out of the oil and therefore can leave the oil and nitrogen in an un-balanced state; either over-saturated or under-saturated. Traditionally measured gas curves start at the fully extended position and stroke to the fully compressed condition and then back to the fully extended position. Assuming the gas and oil are at balance (oil fully saturated) at the start, as the strut is compressed and pressure increased, the oil becomes more under saturated as the higher pressure drives more nitrogen into solution, but the slow change prevents it. Systems and methods disclosed herein, take into account gas absorption and desorption in the fluid (e.g., gas entrainment within the fluid) resulting in more accurate measurements of shock strut servicing conditions, such as gas volume and oil volume. Systems and methods disclosed herein may accurately calculate a shock strut servicing condition, taking into account gas absorption and desorption in the fluid, without the need for a position sensor. In various embodiments, systems and methods disclosed herein allow for determining shock strut servicing conditions using a temperature sensor located externally from the shock strut (e.g., at another location of the aircraft such as in the wheel well, coupled to the fuselage, or coupled to a wing).

The following nomenclature in table 1 corresponds to various equations and parameters described in the present disclosure:

TABLE 1

| Nomenclature |  |
| --- | --- |
| Nomenclature |  |
| Constants | |
| $V_{tot\_primary}$ | total internal volume of the shock strut primary chamber in the fully extended position |
| $V_{tot\_secondary}$ | total internal volume of the shock strut secondary chamber in the fully extended position |
| $A_{P\_1}$ | Primary Piston area |
| $A_{P\_2}$ | Secondary Piston area |
| $C(T)$ | Henry's factor as a function of temperature |
| $X_b$ | shock strut extension in the fully extended position |
| $Z$ | Compressibility factor of the gas |
| $R$ | Universal Gas Constant |
| States | |
| a | represents sensor readings and shock strut state before take-off |
| b | represents sensor readings and shock strut state a pre-determined duration after aircraft takeoff |
| Unknowns | |
| $V_{gas\_1}^a$ | Primary Gas volume in state "a" (Unknown parameter 1) |
| $V_{gas\_2}^a$ | Secondary Gas volume in state "a" (Unknown parameter 2) |
| $V_{gas\_1}^b$ | Primary Gas volume in state "b" (Unknown parameter 3) |
| $V_{gas\_2}^b$ | Secondary Gas volume in state "b" (Unknown parameter 4) |
| $V_{oil\_1}^a$ | Primary Oil volume in primary chamber in state "a" (Unknown parameter 5) |
| $V_{oil\_1}^b$ | Primary Oil volume in primary chamber in state "b" (Unknown parameter 6) |
| $n_{v\_1}^a$ | number of moles of gas dissolved in oil in primary chamber in state "a" per unit volume of oil (Unknown parameter 7) |
| $n_{v\_1}^b$ | number of moles of gas dissolved in oil in primary chamber in state "b" per unit volume of oil (Unknown parameter 8) |
| $V_{oil\_2}^a$ | Secondary Oil volume (in secondary chamber) in state "a" (Unknown parameter 9) (typically a small volume added for lubrication) |
| $V_{oil\_2}^b$ | Secondary Oil volume (in secondary chamber) in state "b" (Unknown parameter 10) (typically a small volume added for lubrication) |
| Measurements | |
| $\hat{S}^a$ | Shock strut stroke in state "a". What is measured directly is shock strut extension, i.e. $\hat{X}_a$, which can be converted to stroke: ($\hat{S}^a = \hat{X}_b - \hat{X}_a$) |
| $\hat{T}^a$ | measured temperature in state "a" |
| $\hat{T}^b$ | measured temperature in state "b" |
| $\hat{P}_{gas-1}^a$ | measured primary chamber pressure in state "a" |
| $\hat{P}_{gas-1}^b$ | measured primary chamber pressure in state "b" |
| $\hat{P}_{gas-2}^a$ | measured secondary chamber pressure in state "a" |
| $\hat{P}_{gas-2}^b$ | measured secondary chamber pressure in state "b" |

The following equations in table 2 correspond to various methods described in the present disclosure:

TABLE 2

Governing Equations (10 total equations)

$$\begin{cases} V_{tot\_primary} - A_{P_1} \times \hat{S}^a + A_{P_2} \times & \text{If } \hat{S}^a \geq S_{activation} \\ (\hat{S}^a - S_{activation}) = V_{gas\_1}^a + V_{oil\_1}^a & \\ V_{tot\_primary} - A_{P_1} \times \hat{S}^a = V_{gas\_1}^a + V_{oil\_1}^a & \text{If } \hat{S}^a < S_{activation} \end{cases} \quad 1$$

$$n_v^a = C(\hat{T}^a) \times G_{gas\_1}^a \quad 2$$

$$\begin{cases} V_{gas\_2}^b + V_{oil\_2}^b = V_{gas\_2}^a + V_{oil\_2}^a + A_{P_2} \times & \text{If } \hat{S}^a \geq S_{activation} \\ (\hat{S}^a - S_{activation}) & \\ V_{gas\_2}^b + V_{oil\_2}^b = V_{gas\_2}^a + V_{oil\_2}^a & \text{If } \hat{S}^a < S_{activation} \end{cases} \quad 3$$

$$V_{tot\_primary} + V_{tot\_secondary} = V_{gas\_2}^b + V_{\_gas\_1}^b + V_{oil\_1}^b + V_{oil\_2}^b \quad 4$$

$$V_{oil\_1}^b = V_{oil\_1}^a \times (1 + \alpha(\hat{T}^b - \hat{T}^a)) \quad 5$$

$$n_v^b = C(\hat{T}^b) \times \hat{P}_{gas\_1}^b \quad 6$$

$$\frac{\hat{P}_{gas\_1}^a V_{gas\_1}^a}{ZR\hat{T}^a} + V_{oil\_1}^a \times N_v^a = \frac{\hat{P}_{gas\_1}^b V_{gas\_1}^b}{ZR\hat{T}^b} + V_{oil\_1}^b \times n_v^b \quad 7$$

$$\frac{\hat{P}_{gas\_2}^a V_{gas\_2}^a}{ZR\hat{T}^a} = \frac{\hat{P}_{gas\_2}^b V_{gas\_2}^b}{ZR\hat{T}^b} \quad 8$$

$$V_{tot\_secondary} = V_{gas\_2b} + V_{oil\_2}^b \quad 9$$

$$V_{oil\_2}^b = V_{oil\_2}^a \times (1 + \alpha(\hat{T}^b - \hat{T}^a)) \quad 10$$

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include shock strut 30 and wheel assembly 20. Landing gear 14 may include shock strut 32 and wheel assembly 22. Landing gear 16 may include shock strut 34 and nose wheel assembly 24. Aircraft 10 may comprise a controller 25. Landing gear 14 may be in communication with controller 25 and may send information to controller 25, for example, shock strut pressure and temperature information.

In various embodiments, controller 25 may comprise one or more processors. Controller 25 may comprise hardware having a tangible, non-transitory memory configured to communicate with controller 25 and having instructions stored thereon that cause controller 25 to perform various operations as described herein.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, a monitoring system for a dual-stage, stroke-activated, mixed gas fluid shock strut is provided herein. A functional schematic view of such a shock strut is presented in FIG. 2A, FIG. 2B, and FIG. 2C.

Figure 2A:
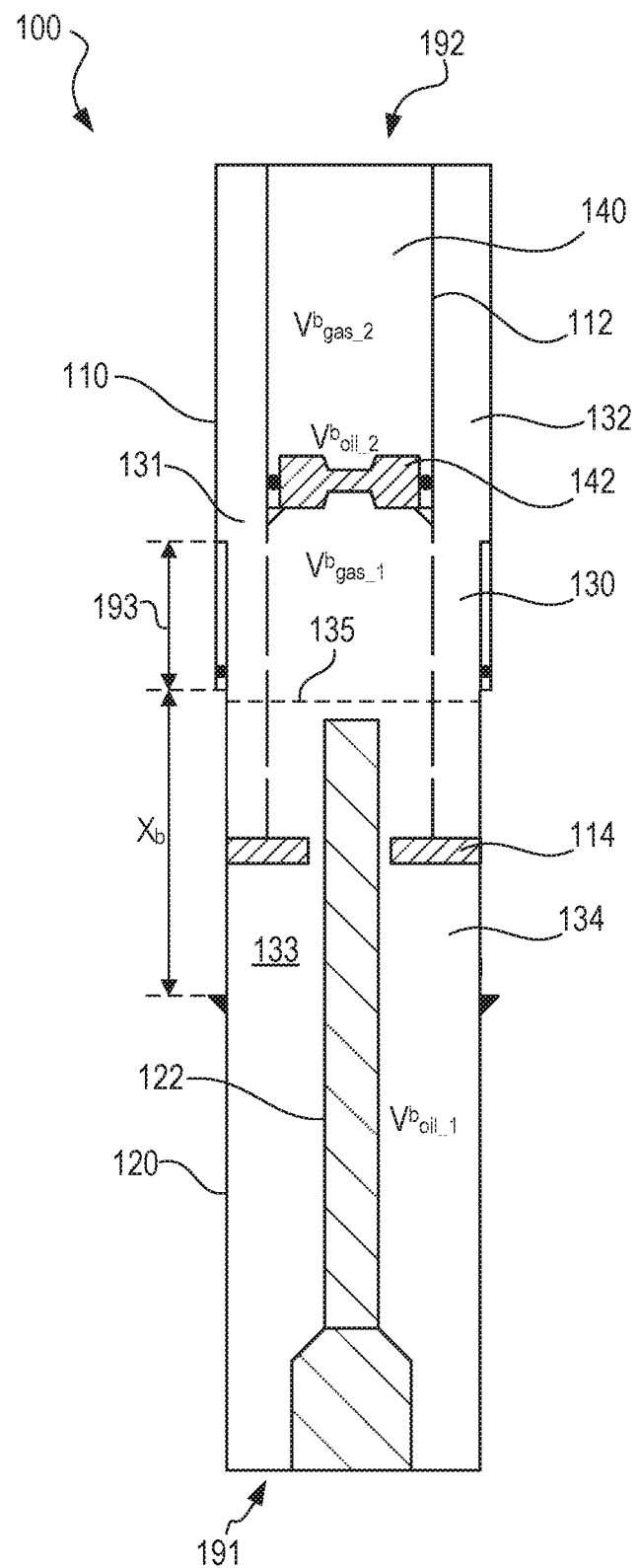
FIG. 2A illustrates a schematic view of a dual-stage, mixed gas/fluid shock strut at a stroke of zero (0) (i.e., maximum extension), in accordance with various embodiments.

With reference to FIG. 2A, a dual-stage, stroke-activated, mixed gas/fluid shock strut (shock strut) 100 is illustrated, in accordance with various embodiments. Shock strut 100 may be similar to shock strut 32 of FIG. 1. Shock strut 100 may comprise a strut cylinder 110 and a strut piston 120. Strut piston 120 may be operatively coupled to strut cylinder 110 as described herein. Strut cylinder 110 may be configured to receive strut piston 120 in a manner that allows the two components to telescope together and absorb and dampen forces transmitted thereto. In various embodiments, a liquid, such as a hydraulic fluid and/or oil may be located within strut cylinder 110. Further, a gas, such as nitrogen or air, may be located within strut cylinder 110. Strut cylinder 110 and strut piston 120 may, for example, be configured to seal such that fluid contained within strut cylinder 110 is prevented from leaking as strut piston 120 translates relative to strut cylinder 110.

Shock strut 100 may consist of a low pressure, primary chamber 130 in which oil and gas can mix. In this regard, a volume of gas (also referred to herein as a primary chamber gas volume) 131 and a volume of oil (also referred to herein as an oil volume) 133 may be contained within primary chamber 130. In this regard, the portion of primary chamber 130 containing the volume of gas 131 may be referred to herein as a primary gas chamber 132. Similarly, the portion of primary chamber 130 containing the oil volume 133 may be referred to herein as an oil chamber 134. Dashed line 135 represents the level of the oil volume 133, or the interface between the oil chamber 134 and the primary gas chamber 132, with shock strut 100 in the fully extended position. Stated differently, the oil volume 133 may be located below dashed line 135 and the volume of gas 131 may be located above dashed line 135. In this regard, the interface between the oil chamber 134 and the primary gas chamber 132 may move relative to primary chamber 130 depending on the position of strut piston 120 relative to strut cylinder 110. Shock strut 100 may further consist of a high pressure, secondary gas chamber 140. Secondary gas chamber 140 may be separated from primary gas chamber 132 via a separator piston 142. An orifice support tube 112 may be positioned within primary chamber 130. Orifice support tube may at least partially define secondary gas chamber 140. Separator piston 142 may be positioned within orifice support tube 112 and may be configured to translate relative thereto. In various embodiments, separator piston 142 may be positioned outside of orifice support tube 112. FIG. 2A illustrates separator piston 142 at a minimum compression stroke (also referred to herein as being "bottomed out"). In various embodiments, separator piston 142 may be located at a minimum compression stroke when shock strut 100 is in the fully extended position (i.e., at a shock strut stroke 193 of zero). An orifice plate 114 may be coupled to orifice support tube 112. Metering pin 122 may translate with strut piston 120 with respect to orifice plate 114.

In various embodiments, shock strut 100 may be installed onto a landing gear of an aircraft. During a landing event, shock strut 100 may be compressed wherein strut piston 120 translates into strut cylinder 110. During the landing, the shock strut may initially function as a single-stage, mixed fluid gas shock strut by metering oil through orifice plate 114 and compressing the primary chamber gas volume 131. The primary gas chamber 132 compression may continue until the secondary gas chamber 140 is mechanically activated.

Figures 2B, 2C:
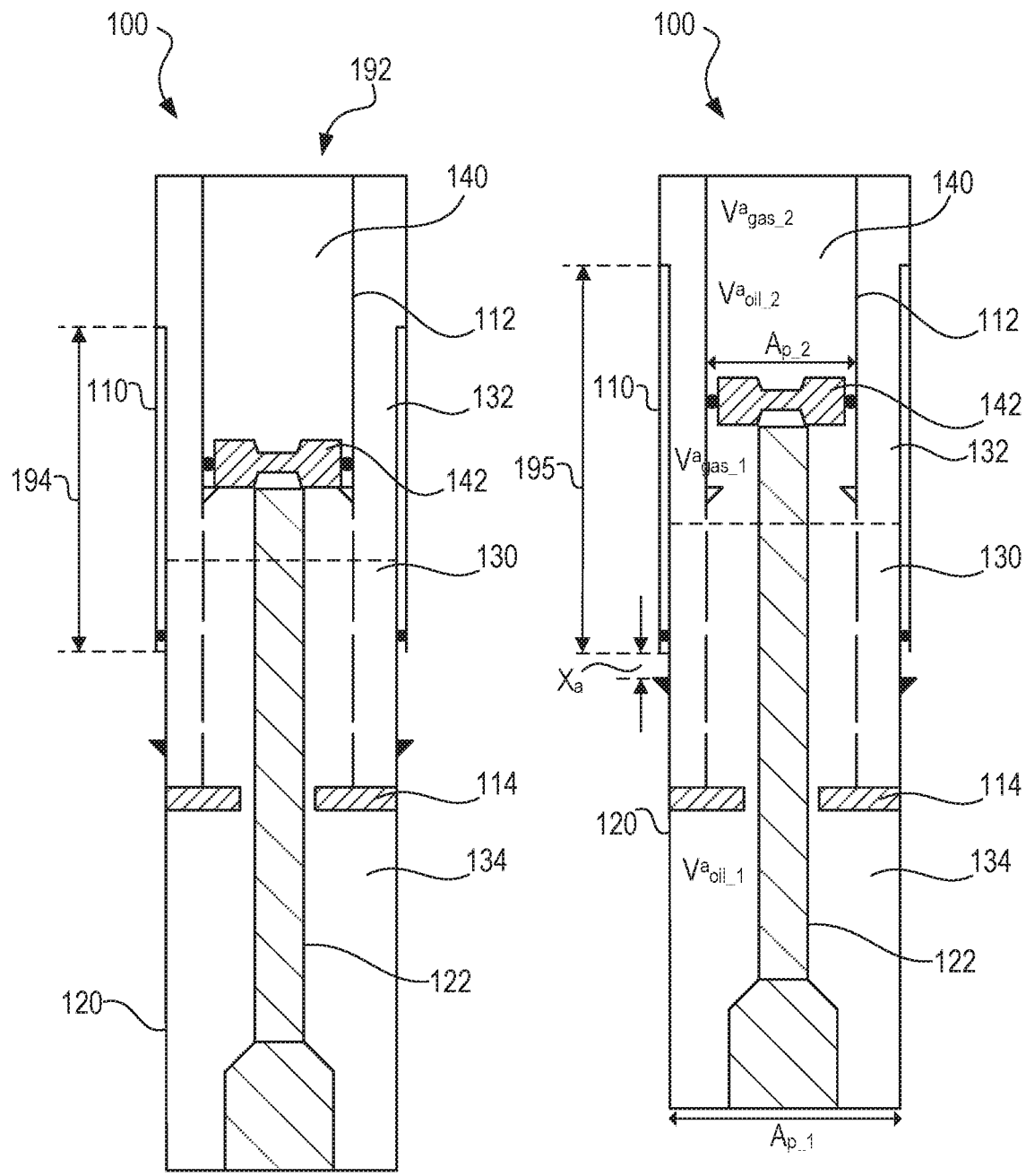
FIG. 2B illustrates a schematic view of the dual-stage, mixed gas/fluid shock strut of FIG. 2A at a secondary gas chamber activation stroke ($S_{activation}$), in accordance with various embodiments.
FIG. 2C illustrates a schematic view of the dual-stage, mixed gas/fluid shock strut of FIG. 2A in a weight-on-wheels condition and in a static position supporting an aircraft, in accordance with various embodiments.

As illustrated in FIG. 2B, this occurs when metering pin 122 reaches, and mechanically engages, the separator piston 142 at a secondary gas chamber activation stroke 194 ($S_{activation}$), of between zero and the maximum shock strut stroke. Separator piston 142 may translate towards second end 192 in response to metering pin 122 engaging separator piston 142. Once the secondary gas chamber 140 is activated, further compression of the shock strut may compress the gas in the secondary gas chamber 140, as illustrated in FIG. 2C. FIG. 2C illustrates shock strut 100 in a compressed position, or at a shock strut stroke 195.

In various embodiments, alternate dual-stage, stroke-activated, mixed gas/fluid shock strut designs may be provided wherein the high pressure, secondary gas chamber 140 is activated in response to the strut piston 120 contacting a separator piston that is located externally from orifice support tube 112.

Figure 3:
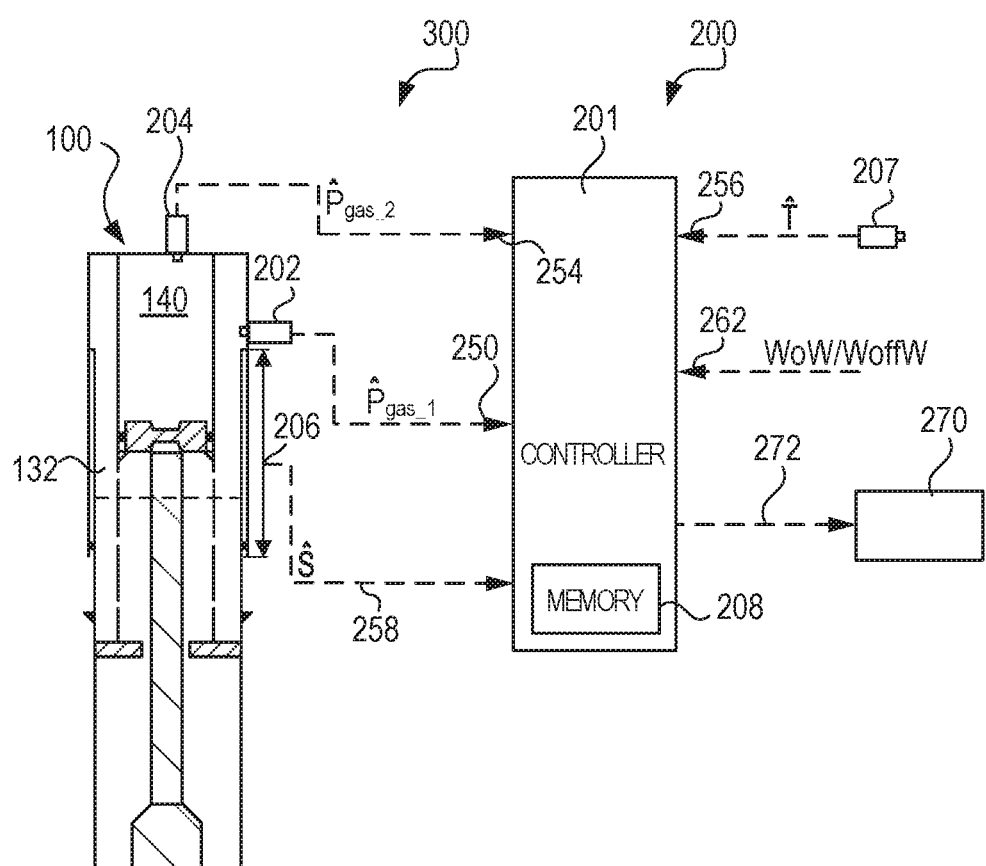
FIG. 3 illustrates a schematic view of a dual-stage, mixed gas/fluid shock strut arrangement comprising the dual-stage, mixed gas/fluid shock strut of FIG. 2A and a monitoring system, in accordance with various embodiments.

With reference to FIG. 3, a dual-stage, stroke activated, mixed fluid gas shock strut arrangement (shock strut arrangement) 300 is illustrated, in accordance with various embodiments. Shock strut arrangement 300 may include shock strut 100 and a monitoring system 200. Monitoring system 200 may comprise various sensing elements for measuring various parameters and providing measurements to a monitoring algorithm. Monitoring system 200 may comprise a pressure sensor (also referred to herein as a first sensor) 202 installed on the primary gas chamber 132 to measure gas pressure within primary gas chamber 132. It is contemplated herein that, although described herein as a pressure sensor 202, it is contemplated herein that an integrated pressure/temperature sensor may be used in place of pressure sensor 202 in order to measure both temperature and pressure within primary gas chamber 132, in accordance with various embodiments. Monitoring system 200 may comprise a pressure sensor (also referred to herein as a second sensor) 204 installed on the secondary gas chamber 140 to measure gas pressure within secondary gas chamber 140. Although described herein as a pressure sensor 204, it is contemplated herein that an integrated pressure/temperature sensor may be used in place of pressure sensor 204 in order to measure both temperature and pressure within secondary gas chamber 140. Monitoring system 200 may comprise a position sensor (also referred to herein as a stroke sensor) 206 configured to measure the stroke of shock strut 100. However, in various embodiments, position sensor 206 may be omitted and the stroke of shock strut 100 may be measured manually (e.g., by hand).

Monitoring system 200 may further comprise a temperature sensor 207. Temperature sensor 207 may be installed in close proximity to shock strut 100. For example, temperature sensor 207 may be installed within a wheel bay of an aircraft. With momentary reference to FIG. 1, a temperature sensor 44 may be installed within wheel bay 42 of aircraft 10. In this regard, temperature sensor 207 may be similar to temperature sensor 44 of FIG. 1. It is further contemplated that temperature sensor 207 may be installed in other locations of aircraft 10 (see FIG. 1) in close proximity to shock strut 100, including the fuselage, the wings, etc. Temperature sensor 207 may measure the ambient temperature 256, wherein the temperature of shock strut 100 and the fluids contained therein are assumed to be equal to or approximately equal to the ambient temperature 256.

In various embodiments, shock strut temperatures of the present disclosure may be measured indirectly using an ambient temperature to estimate fluid temperatures. In various embodiments, shock strut temperatures of the present disclosure may be directly measured using an integrated pressure/temperature sensor (e.g., sensors 202, 204). In this regard, the present disclosure contemplates various methods for determining a shock strut fluid temperature.

Pressure sensor 202 may measure primary chamber gas pressure 250 ($\hat{P}_{gas-1}$). Pressure sensor 204 may measure secondary chamber gas pressure 254 ($\hat{P}_{gas-2}$). Stroke sensor 206 may directly or indirectly measure shock strut stroke 258 ($\hat{S}$). In various embodiments, shock strut stroke 258 ($\hat{S}$) is measured manually, for example using a caliper or a ruler. Temperature sensor 207 may measure ambient temperature 256 ($\hat{T}$). Primary chamber gas pressure 250 ($\hat{P}_{gas-1}$), secondary chamber gas pressure 254 ($\hat{P}_{gas-2}$), shock strut stroke ($\hat{S}$), and ambient temperature 256 ($\hat{T}$) may be referred to herein as sensor readings.

Monitoring system 200 may be devised assuming that the sensors comprise a minimum sampling frequency of between 60 Hz and 1000 Hz in accordance with various embodiments, between 60 Hz and 200 Hz in accordance with various embodiments, or about 100 Hz in accordance with various embodiments, wherein the term "about" in this regard may mean±20 Hz.

With reference to FIG. 3, monitoring system 200 may comprise a controller 201 and a tangible, non-transitory memory 208 configured to communicate with the controller 201. The tangible, non-transitory memory 208 may have instructions stored thereon that, in response to execution by the controller 201, cause the controller 201 to perform various operations as described herein. Monitoring system 200 may comprise a visual display 270. Visual display 270 may be in electronic communication with controller 201. As described herein, controller 201 may issue or send a servicing message 272. Servicing message 272 may be displayed on visual display 270. In various embodiments, servicing message 272 may comprise an indication of a quantity of oil or gas in shock strut 100 based upon the sensor readings. In various embodiments, servicing message 272 may comprise a current and/or a voltage signal. Controller 201 may be in electronic communication with pressure sensor 202 and pressure sensor 204.

In various embodiments, controller 201 may receive a shock strut status signal 262 indicating a state of the shock strut 100. In various embodiments, controller 201 may detect, via shock strut status signal 262, that shock strut 100 is in a first state, such as before a take-off event (i.e., before aircraft 10 (see FIG. 1) has taken off, with weight on wheels (WONW) (i.e., with shock strut 100 supporting the weight of the aircraft), and in a static position). In various embodiments, controller 201 may detect, via shock strut status signal 262, that shock strut 100 is in a second state, such as after a take-off event (i.e., after aircraft 10 (see FIG. 1) has taken off, with weight off wheels (WOFFW), and in a static position). In various embodiments, shock strut status signal 262 is based on an internal pressure of shock strut 100 whereby controller 201 determines a stroke position of shock strut 100 for determining whether the shock strut is supporting the weight of an aircraft. For example, the internal pressure of shock strut 100 may be greater in a WONW state than in a WOFFW state. In various embodiments, shock strut status signal 262 is based on a stroke of shock strut 100 whereby controller 201 determines whether the shock strut is supporting the weight of an aircraft. For example, the shock strut stroke may be greater in a WONW state (e.g., a compressed position) than in a WOFFW state (e.g., fully extended position). In this manner, controller 201 may take pressure, position, and/or temperature measurements of shock strut 100 based on a status of the shock strut status signal 262. For example, in response to shock strut status signal 262 indicating a change from a WONW condition to a WOFFW condition of shock strut 100, controller 201 may take pressure and temperature measurements of shock strut 100 in the second state.

In various embodiments, controller 201 may comprise one or more controllers. For example, a first controller may receive sensor information and a second controller may perform the calculations or transmit sensor information to other systems as described herein.

Figure 4:
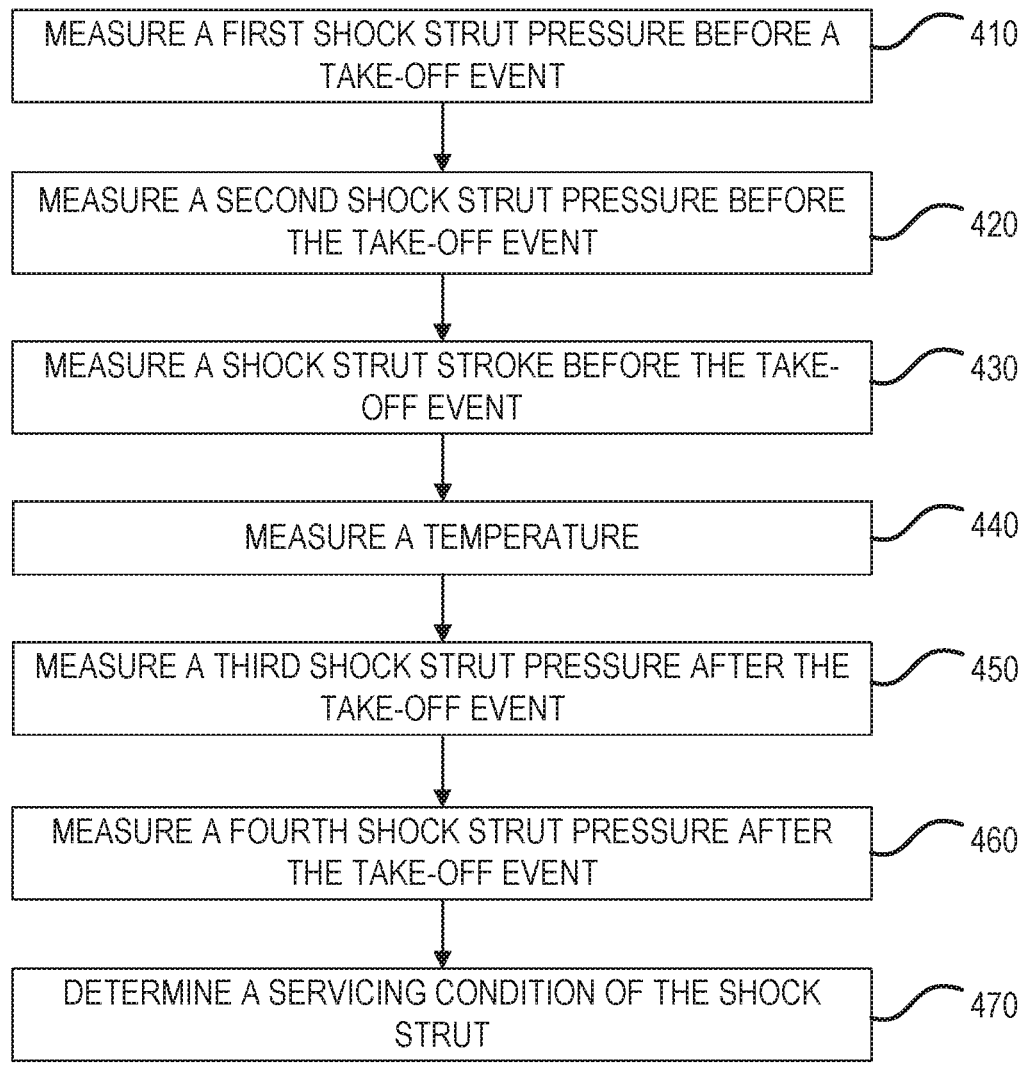
FIG. 4 and FIG. 5 illustrate methods for monitoring a shock strut utilizing a system of equations, in accordance with various embodiments.

With reference to FIG. 4, a method 400 for monitoring a shock strut is provided, in accordance with various embodiments. Method 400 includes measuring a first shock strut pressure before a take-off event (step 410). Method 400 includes measuring a second shock strut pressure before the take-off event (step 420). Method 400 includes measuring a shock strut stroke before the take-off event (step 430). Method 400 includes measuring a temperature (step 440). Method 400 includes measuring a third shock strut pressure after the take-off event (step 450). Method 400 includes measuring a fourth shock strut pressure after the take-off event (step 460). Method 400 includes determining a servicing condition of the shock strut (step 470).

With combined reference to FIG. 2C, FIG. 3, and FIG. 4, step 410 may include measuring primary chamber gas pressure 250 ($\hat{P}_{gas\text{-}1}{}^a$) in a first state, such as before a take-off event (i.e., before aircraft 10 (see FIG. 1) has taken off, with weight on wheels (WONW) (i.e., with shock strut 100 supporting the weight of the aircraft), and in a static position) via pressure sensor 202. For example, step 410 may be performed before push-back onto a runway. In various embodiments, step 410 is performed within thirty minutes before push-back onto a runway. In various embodiments, step 410 is performed within sixty minutes before take-off of the aircraft. Step 420 may include measuring secondary chamber gas pressure 254 ($\hat{P}_{gas\text{-}2}{}^a$) before the take-off event via pressure sensor 204. Step 420 may be performed under similar conditions as step 410. In various embodiments, step 410 and step 420 are performed at substantially the same time. In various embodiments, step 410 is performed within five minutes of step 420. In various embodiments, step 410 and step 420 are performed simultaneously. Step 430 may include measuring a shock strut stroke ($\hat{S}^a$) before the take-off event. Step 430 may be performed under similar conditions as step 410 and step 420. Step 430 may be performed using a measuring device, such as a ruler for example, to manually measure shock strut stroke 195. However, in various embodiments, shock strut stroke ($\hat{S}^a$) may be measured automatically using stroke sensor 206. In this regard, primary chamber gas pressure 250 ($\hat{P}_{gas\text{-}1}{}^a$), secondary chamber gas pressure 254 ($\hat{P}_{gas\text{-}2}{}^a$), and shock strut stroke ($\hat{S}^a$) may be measured before take-off under static conditions and stored (e.g., in memory 208) for later use. In various embodiments, shock strut stroke ($\hat{S}^a$) may be entered manually into controller 201 using an input device such as a keyboard for example.

In various embodiments, step 440 may include measuring ambient temperature 256 ($\hat{T}$) using temperature sensor 207. In various embodiments, step 440 is performed before take-off to measure temperature ($\hat{T}^a$). In various embodiments, step 440 is performed after take-off to measure temperature ($\hat{T}^b$). In various embodiments, step 440 is performed both before take-off to measure temperature ($\hat{T}^a$) and again after take-off to measure temperature ($\hat{T}^b$) (see FIG. 6 and FIG. 7). However, In various embodiments, step 440 is performed once either before take-off to measure temperature ($\hat{T}^a$) or after take-off to measure temperature ($\hat{T}^b$), wherein the measured temperature ($\hat{T}$) is used for both temperature ($\hat{T}^a$) and temperature ($\hat{T}^b$), under the assumption that the temperature inside of shock strut 100 does not substantially change between step 410 and step 450.

In various embodiments, with combined reference to FIG. 2A, FIG. 3, and FIG. 4, step 450 may include measuring primary chamber gas pressure ($\hat{P}_{gas\text{-}1}{}^b$) in a second state, such as after a take-off event (i.e., after aircraft 10 (see FIG. 1) has taken off, with weight off wheels (WOFFW), and in a static position) via pressure sensor 202. In various embodiments, step 450 is performed within thirty minutes after push-back onto a runway. In various embodiments, step 450 is performed within ten minutes after take-off. In various embodiments, step 450 is performed within thirty minutes after take-off. Step 460 may include measuring secondary chamber gas pressure 254 ($\hat{P}_{gas\text{-}2}{}^b$) after the take-off event via pressure sensor 204. Step 460 may be performed under similar conditions as step 450. In various embodiments, step 460 and step 450 are performed at substantially the same time. In various embodiments, step 450 is performed within five minutes of step 460. In various embodiments, step 450 and step 460 are performed simultaneously. In various embodiments, the shock strut stroke ($\hat{S}^b$) of shock strut 100 is known after the take-off event. For example, the shock strut 100 may be in a fully extended position where the shock strut stroke $\hat{S}^b$ is zero or shock strut 100 may be in a known compressed position. In this regard, primary chamber gas pressure ($\hat{P}_{gas\text{-}1}{}^b$) and secondary chamber gas pressure ($\hat{P}_{gas\text{-}2}{}^b$) may be measured after take-off under static conditions and stored (e.g., in memory 208) for use in determining a servicing condition of shock strut 100 (i.e., calculating the levels of fluids in shock strut 100).

Having measured $\hat{P}_{gas\text{-}1}{}^a$, $\hat{P}_{gas\text{-}2}{}^a$, $\hat{S}^a$, $\hat{T}^a$, $\hat{T}^b$, $\hat{P}_{gas\text{-}1}{}^b$, and $\hat{P}_{gas\text{-}2}{}^b$, step 470 may include determining a servicing condition of shock strut 100 (i.e., calculating the levels of fluids in shock strut 100). Step 470 may include solving the ten equations in table 2. Equations 1 through 10 may be solved by controller 201. Step 470 involves solving the provided set of ten equations with ten unknown values, as provided in table 1, using any suitable method for solving a system of equations. Furthermore, after solving the system of equations, as provided in table 2, the unknown parameters (unknown parameters 1-10), as provided in table 1 become known. In this regard, step 470 includes solving for the primary chamber gas volume ($V_{gas\_1}$), the secondary chamber gas volume ($V_{gas\_2}$), the primary chamber oil volume ($V_{oil\_1}$), and the secondary chamber oil volume ($V_{oil\_2}$). These calculated parameters may be compared with known threshold values to determine whether shock strut 100 needs servicing with gas and/or oil.

Figure 5:
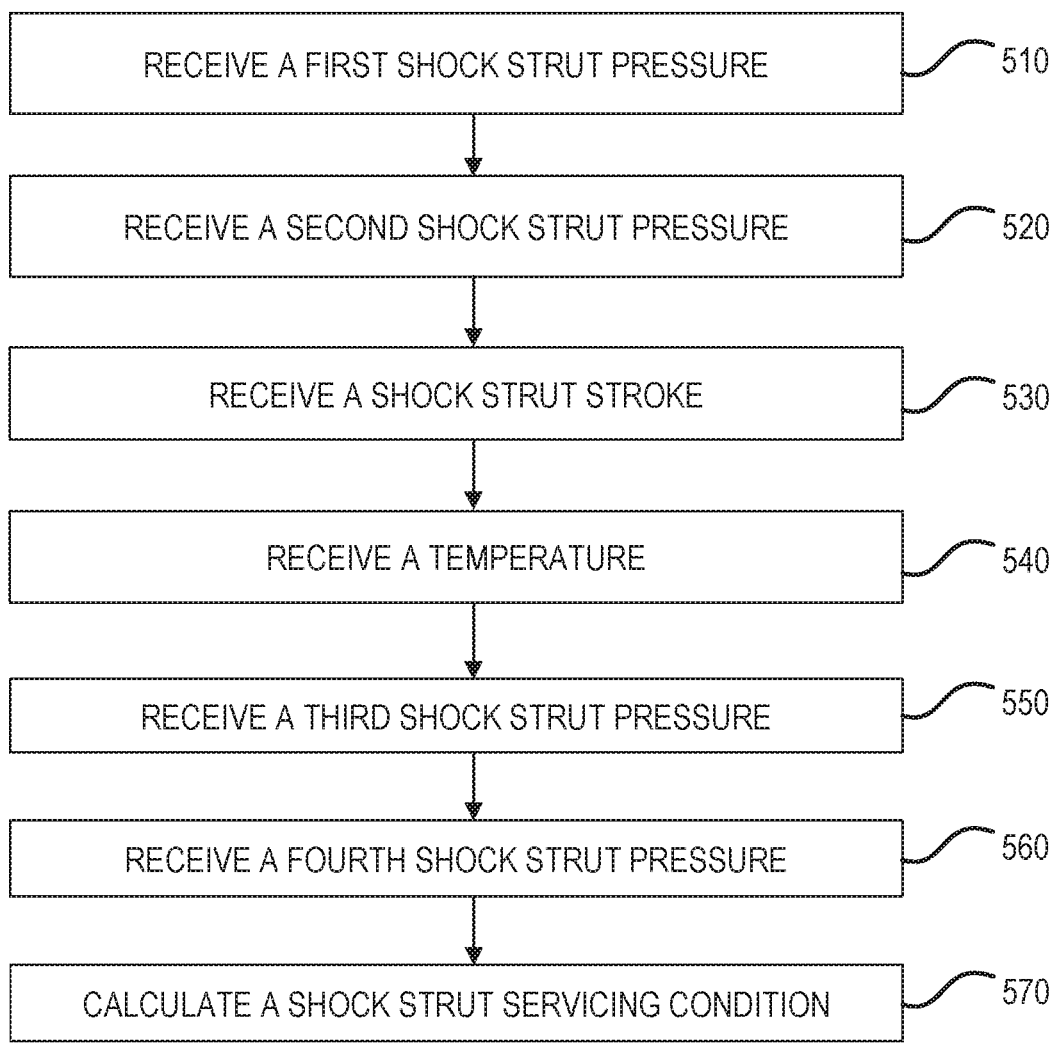

With reference to FIG. 5, a method 500 for monitoring a shock strut is provided, in accordance with various embodiments. Method 500 includes receiving a first shock strut pressure (step 510). Method 500 includes receiving a second shock strut pressure (step 520). Method 500 includes receiving a shock strut stroke (step 530). Method 500 includes receiving a temperature (step 540). Method 500 includes receiving a third shock strut pressure (step 550). Method 500 includes receiving a fourth shock strut pressure (step 560). Method 500 includes calculating a shock strut servicing condition (step 570).

With combined reference to FIG. 3 and FIG. 5, step 510 may include receiving, by controller 201, primary chamber gas pressure ($\hat{P}_{gas\text{-}1}{}^a$). Step 520 may include receiving, by controller 201, secondary chamber gas pressure ($\hat{P}_{gas\text{-}2}{}^a$). Step 530 may include receiving, by controller 201, shock strut stroke ($\hat{S}^a$). Step 540 may include receiving, by controller 201, ambient temperature ($\hat{T}$). Step 550 may include receiving, by controller 201, primary chamber gas pressure ($\hat{P}_{gas-1}$). Step 560 may include receiving, by controller 201, secondary chamber gas pressure ($\hat{P}_{gas-2}$). Step 570 may include calculating, by controller 201, a servicing condition of shock strut 100. In various embodiments, step 570 includes solving, by controller 201, the system of equations as provided in Table 2 herein.

Figure 6:
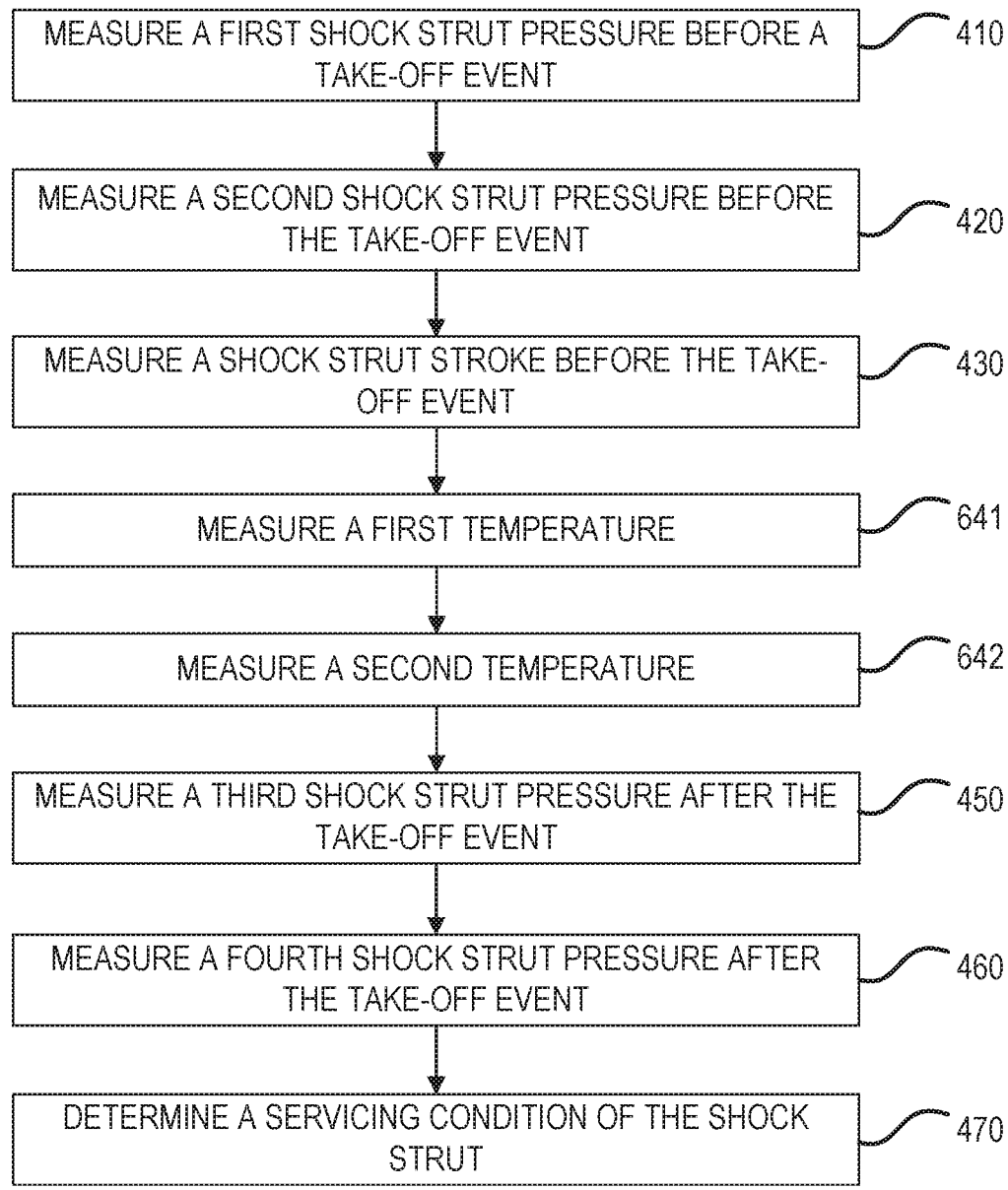
FIG. 6 and FIG. 7 illustrate methods for monitoring a shock strut utilizing a system of equations and two separately measured temperatures, in accordance with various embodiments.

With respect to FIG. 6, elements with like element numbering, as depicted in FIG. 4, are intended to be the same and will not necessarily be repeated for the sake of clarity.

With reference to FIG. 6, a method 600 for monitoring a shock strut is provided, in accordance with various embodiments. In various embodiments, method 600 is similar to method 400 of FIG. 4, except that method 600 includes measuring a first ambient temperature associated with a first state and a second ambient temperature associated with a second state. In this regard, method 600 includes measuring a first temperature (step 641) and measuring a second temperature (step 642). In various embodiments, step 641 is performed both before take-off to measure temperature ($\hat{T}^a$). In various embodiments, step 642 is performed after take-off to measure temperature ($\hat{T}^b$). In various embodiments, step 642 is performed within a pre-determined duration before take-off to measure temperature ($\hat{T}^b$), such that the second temperature is equal to, or substantially equal to, the temperature of shock strut 100 at the time that step 450 and step 460 are performed.

Figure 7:
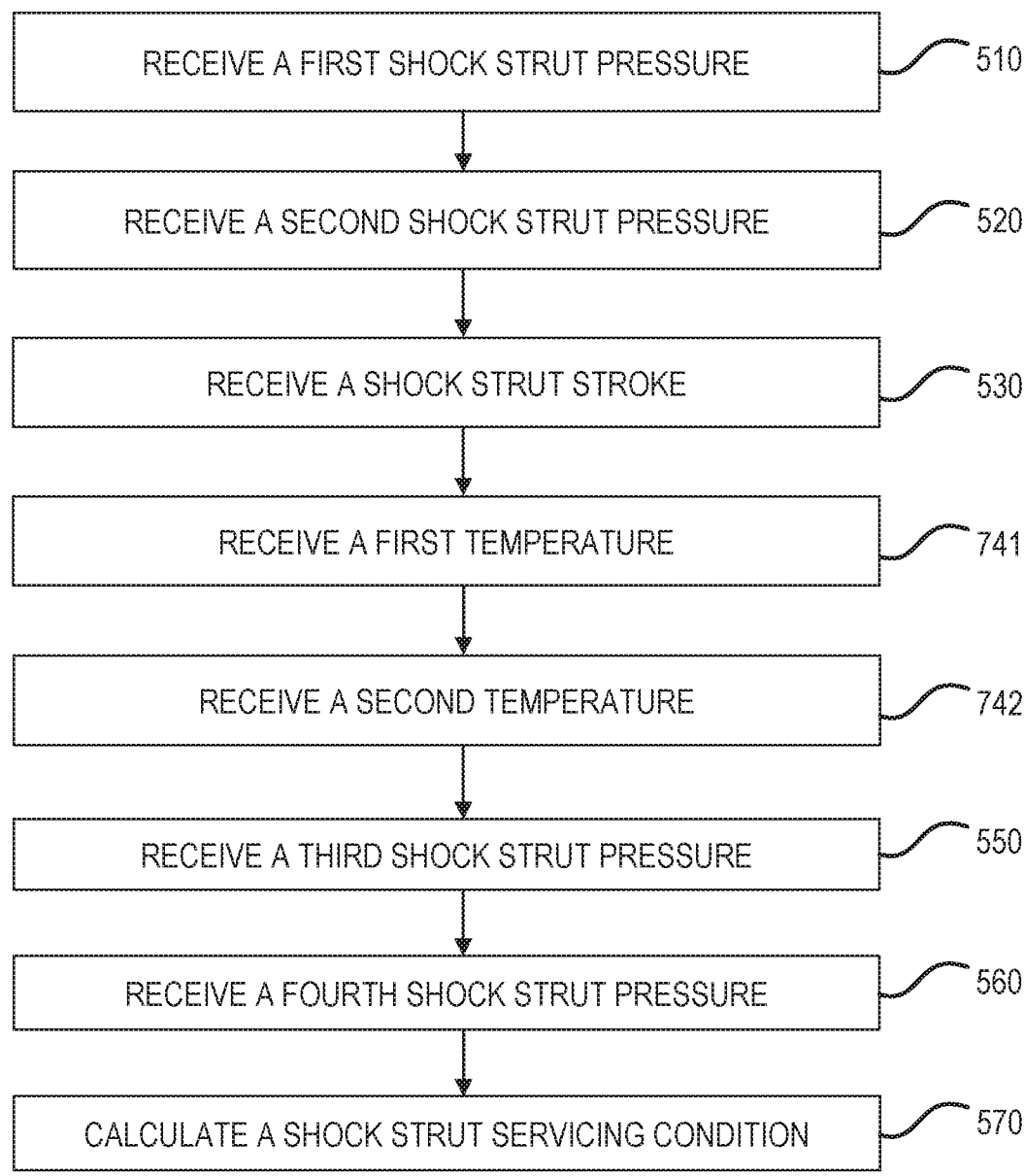

With respect to FIG. 7, elements with like element numbering, as depicted in FIG. 5, are intended to be the same and will not necessarily be repeated for the sake of clarity.

With reference to FIG. 7, a method 700 for monitoring a shock strut is provided, in accordance with various embodiments. In various embodiments, method 700 is similar to method 500 of FIG. 5, except that method 700 includes receiving a first ambient temperature associated with a first state and a second ambient temperature associated with a second state. In this regard, method 700 includes receiving a first temperature (step 741) and receiving a second temperature (step 742). In various embodiments, step 741 is performed both before take-off to measure temperature ($\hat{T}^a$). In various embodiments, the temperature associated with step 742 is measured after take-off to measure temperature ($\hat{T}^b$). In various embodiments, the temperature associated with step 742 is measured within a pre-determined duration before take-off to measure temperature ($\hat{T}^b$), such that the second temperature is equal to, or substantially equal to, the temperature of shock strut 100 at the time that the third shock strut pressure of step 550 and the fourth shock strut pressure of step 460 are measured.

In various embodiments, method 500 and/or method 700 may be performed on-board an aircraft in real time or during pre-determined intervals. In this regard, the measurements associated with method 400 and/or method 600 may be stored on-board an aircraft and/or may be transmitted to an off-aircraft system for processing and determining landing gear shock strut fluid levels.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for monitoring a dual-stage shock strut, comprising:
   receiving, by a controller, a first pressure signal from a first pressure sensor mounted to the dual-stage shock strut;

15 determining, by the controller, a first primary chamber pressure when the dual-stage shock strut is in a first state using the first pressure signal, wherein the first state comprises the dual-stage shock strut in a static position and in a weight-on-wheel condition;

receiving, by the controller, a second pressure signal from a second pressure sensor mounted to the dual-stage shock strut;

determining, by the controller, a first secondary chamber pressure when the dual-stage shock strut is in the first state using the second pressure signal;

determining, by the controller, a shock strut stroke when the dual-stage shock strut is in the first state;

determining, by the controller, a first ambient temperature corresponding to that of the dual-stage shock strut when the dual-stage shock strut is in the first state;

determining, by the controller, a second primary chamber pressure when the dual-stage shock strut is in a second state, wherein the second state comprises the dual-stage shock strut in a weight-off-wheel position and within a first duration of time after a take-off event;

determining, by the controller, a second secondary chamber pressure when the dual-stage shock strut is in the second state;

determining, by the controller, a second ambient temperature corresponding to that of the dual-stage shock strut when the dual-stage shock strut is in the second state;

determining, by the controller, a servicing condition of the dual-staged shock strut based upon at least the first primary chamber pressure, the first secondary chamber pressure, the shock strut stroke, the first ambient temperature, the second primary chamber pressure, the second secondary chamber pressure, and the second ambient temperature; and sending, by the controller, a servicing message indicative of the shock strut servicing condition to a display.

2. The method of claim 1, wherein determining, by the controller, the second primary chamber pressure comprises receiving, by the controller, a third pressure signal from the first pressure sensor; and wherein determining, by the controller, the second secondary chamber pressure comprises receiving, by the controller, a fourth pressure signal from the second pressure sensor.

3. The method of claim 1, wherein the first ambient temperature is measured using a temperature sensor in close proximity to the dual-stage shock strut.

4. The method of claim 3, wherein the temperature sensor is located in a wheel well.

5. The method of claim 1, wherein the shock strut stroke is measured at least one of manually or via a sensor.

6. The method of claim 1, wherein the servicing condition comprises at least one of a primary chamber gas volume, a secondary chamber gas volume, a primary chamber oil volume, and a secondary chamber oil volume.

7. The method of claim 6, wherein the servicing condition is determined by solving a set of equations in table 2.

8. The method of claim 1, wherein the second ambient temperature measurement associated with the second state is measured within a second duration before the take-off event, and the pressure measurement associated with the second state is measured after the take-off event.

9. A method for monitoring a dual-stage shock strut, comprising:

calculating, by the controller, a servicing condition of the dual-stage shock strut; and sending, by the controller, a servicing message indicative of the shock strut servicing condition to a display;

wherein the servicing condition of the dual-stage shock strut is calculated based upon:

a first primary chamber pressure received from a first pressure sensor mounted to the dual-stage shock strut when the dual-stage shock strut is in a first state;

a first secondary chamber pressure received from a second pressure sensor mounted to the dual-stage shock strut when the dual-stage shock strut is in the first state;

a shock strut stroke when the dual-stage shock strut is in the first state;

a first ambient temperature corresponding to that of the shock strut in the first state;

a second ambient temperature corresponding to that of the shock strut in a second state;

a second primary chamber pressure received from the first pressure sensor mounted to the dual-stage shock strut when the dual-stage shock strut is in the second state; and a second secondary chamber pressure received from the second pressure sensor mounted to the dual-stage shock strut when the dual-stage shock strut is in the second state;

wherein the calculating comprises:

calculating, by the controller, a primary gas volume in the first state;

calculating, by the controller, a primary gas volume in the second state;

calculating, by the controller, a secondary gas volume in the first state;

calculating, by the controller, a secondary gas volume in the second state;

calculating, by the controller, a primary oil volume in the first state;

calculating, by the controller, a primary oil volume in the second state;

calculating, by the controller, a secondary oil volume in the first state;

calculating, by the controller, a secondary oil volume in the second state;

calculating, by the controller, a first number of moles of gas dissolved in an oil in the first state; and calculating, by the controller, a second number of moles of gas dissolved in the oil in the second state.

10. The method of claim 9, wherein the calculating includes solving an equation $$\frac{\hat{P}^a_{gas\_2} V^a_{gas\_2}}{ZR\hat{T}^a} = \frac{\hat{P}^b_{gas\_2} V^b_{gas\_2}}{ZR\hat{T}^b},$$

wherein $\hat{P}^a_{gas\_2}$ is the first secondary chamber pressure, $\hat{P}^b_{gas\_2}$ is the second secondary chamber pressure, $V^a_{gas\_2}$ is a gas volume in a secondary chamber of the dual-stage shock strut in the first state, $V^b_{gas\_2}$ is a gas volume in the secondary chamber of the dual-stage shock strut in the second state, Z is a compressibility factor, R is a universal gas constant, $\hat{T}^a$ is the first ambient temperature, and $\hat{T}^b$ is the second ambient temperature.

11. The method of claim 10, wherein the calculating includes solving an equation $V_{tot\_primary} - A_{P_1} \times \hat{S}^a + A_{P_2} \times (\hat{S}^a - S_{activation}) = V^a_{gas\_1} + V^a_{oil\_1}$ in response to the shock strut stroke being greater than or equal to an activation stroke of the dual-stage shock strut, wherein $V_{tot\_primary}$ is a total internal volume of a primary chamber of the dual-stage shock strut in a fully extended position, $A_{P_1}$ is an area of a primary piston of the dual-stage shock strut, $\hat{S}^a$ is the shock strut stroke of the dual-stage shock strut, $A_{P_2}$ is an area of a separator piston of the dual-stage shock strut, $S_{activation}$ is the activation stroke of the dual-stage shock strut, $V_{gas\_1}{}^a$ is a gas volume in the primary chamber of the dual-stage shock strut in the first state, and $V_{oil\_1}{}^a$ is a volume of oil in the primary chamber of the dual-stage shock strut in the first state.

12. The method of claim 11, wherein the calculating includes solving an equation $V_{tot\_primary} - A_{P_1} \times \hat{S}^a = V_{gas\_1}{}^a + V_{oil\_1}{}^a$ in response to the shock strut stroke being less than the activation stroke of the dual-stage shock strut, wherein $V_{tot\_primary}$ is the total internal volume of a primary chamber of the dual-stage shock strut in a fully extended position, $A_{P_1}$ is the area of the primary piston of the dual-stage shock strut, $\hat{S}^a$ is the shock strut stroke of the dual-stage shock strut, $V_{gas\_1}{}^a$ is the gas volume in the primary chamber of the dual-stage shock strut in the first state, and $V_{oil\_1}{}^a$ the volume of oil in the primary chamber of the dual-stage shock strut in the first state.

13. A shock strut monitoring system, comprising:
  a first pressure sensor configured to be mounted to, and measure a primary chamber pressure of, a dual-stage shock strut;
  a second pressure sensor configured to be mounted to, and measure a secondary chamber pressure of, the dual-stage shock strut;
  a controller; and
  a tangible, non-transitory memory configured to communicate with the controller, the tangible, non-transitory memory having instructions stored thereon that, in response to execution by the controller, cause the controller to perform operations comprising:
    receiving, by the controller, a first shock strut pressure from the first pressure sensor;
    receiving, by the controller, a second shock strut pressure from the second pressure sensor;
    receiving, by the controller, a shock strut stroke;
    receiving, by the controller, a first temperature from at least one of the first pressure sensor, the second pressure sensor, or a temperature sensor;
    receiving, by the controller, a third shock strut pressure from the first pressure sensor;
    receiving, by the controller, a fourth shock strut pressure from the second pressure sensor;
    receiving, by the controller, a second temperature from the at least one of the first pressure sensor, the second pressure sensor, or the temperature sensor; and
    calculating, by the controller, a servicing condition of the dual-stage shock strut and sending, by the controller, a servicing message indicative of the shock strut servicing condition to a display;
  wherein the calculating the servicing condition comprises:
    calculating, by the controller, a primary gas volume in a first state;
    calculating, by the controller, a primary gas volume in a second state;
    calculating, by the controller, a secondary gas volume in the first state;
    calculating, by the controller, a secondary gas volume in the second state;
    calculating, by the controller, a primary oil volume in the first state;
    calculating, by the controller, a primary oil volume in the second state;
    calculating, by the controller, a secondary oil volume in the first state;
    calculating, by the controller, a secondary oil volume in the second state;
    calculating, by the controller, a first number of moles of gas dissolved in an oil in the first state; and
    calculating, by the controller, a second number of moles of gas dissolved in the oil in the second state.

14. The shock strut monitoring system of claim 13, wherein the first shock strut pressure comprises a first primary chamber pressure when the dual-stage shock strut is in the first state, and the second shock strut pressure comprises a first secondary chamber pressure when the dual-stage shock strut is in the first state.

15. The shock strut monitoring system of claim 14, wherein the shock strut stroke comprises a shock strut stroke when the dual-stage shock strut is in the first state.

16. The shock strut monitoring system of claim 15, wherein the first temperature comprises an ambient temperature corresponding to that of the shock strut.

17. The shock strut monitoring system of claim 16, wherein the third shock strut pressure comprises a second primary chamber pressure when the dual-stage shock strut is in the second state.

18. The shock strut monitoring system of claim 17, wherein the fourth shock strut pressure comprises a second secondary chamber pressure when the dual-stage shock strut is in the second state.

19. The shock strut monitoring system of claim 13, wherein at least one of the first shock strut pressure and the second shock strut pressure and at least one of the first temperature and the second temperature are measured using a single, integrated pressure/temperature sensor mounted to the shock strut.

* * * * *

UNITED STATES PATENT AND TRADEMARK OFFICE
CERTIFICATE OF CORRECTION

PATENT NO. : 11,390,397 B2
APPLICATION NO. : 16/381981
DATED : July 19, 2022
INVENTOR(S) : Amir Fazeli et al.

It is certified that error appears in the above-identified patent and that said Letters Patent is hereby corrected as shown below:

In the Claims

In Claim 13, Column 17, Line 51, after the phrase "or the temperature sensor;" please delete the word "and"

Signed and Sealed this
Eighteenth Day of October, 2022

Katherine Kelly Vidal
*Director of the United States Patent and Trademark Office*